(12) United States Patent
Cummins (10) Patent No.: US 6,868,880 B2
(45) Date of Patent: Mar. 22, 2005

(54) WHEEL ASSEMBLY AND METHOD FOR INSTALLATION AND REMOVAL

(75) Inventor: William T. Cummins, Atwater, OH (US)

(73) Assignee: Trelleborg Wheel Systems Americas, Inc., Hartville, OH (US)

(*) Notice: Subject to any disclaimer, the term of this patent is extended or adjusted under 35 U.S.C. 154(b) by 0 days.

(21) Appl. No.: 10/612,546

(22) Filed: Jul. 1, 2003

(65) Prior Publication Data

US 2005/0001469 A1 Jan. 6, 2005

(51) Int. Cl.⁷ .............................................. B60B 21/10
(52) U.S. Cl. ...................... 152/396; 301/10.1; 157/1.3; 29/894.322
(58) Field of Search ............................. 301/10.1, 9.1, 301/9.2, 11.1, 23, 35.61, 95.101, 5.3, 5.1, 64.701, 63.106; 152/311, 393, 394, 539, 396, 386; 29/894.322, 894.323, 525, 802; 157/1.3

(56) References Cited

U.S. PATENT DOCUMENTS

| | | | |
|---|---|---|---|
| 1,108,813 A | 7/1914 | Murray | |
| 1,395,362 A | 11/1921 | Rubsam | |
| 1,638,476 A | 8/1927 | Dalton | |
| 1,653,331 A | * 12/1927 | Atwood | 152/323 |
| 1,797,195 A | * 3/1931 | Burdette | 301/12.1 |
| 2,709,471 A | * 5/1955 | Smith et al. | 152/310 |
| 3,771,833 A | 11/1973 | Smith | |
| 4,534,394 A | * 8/1985 | Grawey | 152/396 |
| 4,662,418 A | 5/1987 | Janus | |
| 4,923,252 A | 5/1990 | Plamper et al. | |
| 5,135,288 A | * 8/1992 | Kelly | 301/8 |
| 5,579,818 A | * 12/1996 | Hoppenheit et al. | 152/393 |

* cited by examiner

Primary Examiner—Frantz F. Jules
(74) Attorney, Agent, or Firm—Sand & Sebolt (57) ABSTRACT

A wheel assembly comprises a generally frustoconical wheel having an upper wall defining a recessed area and a lateral wall with a tapered outer surface; a generally frustoconical rim having a top wall defining a central hole and a side wall with an outer surface and a tapered inner surface complementary with the outer surface of the wheel; and a solid tire attached to the outer surface of the rim. The recessed area is partially covered by the top wall of the rim when the rim is installed on the wheel. To install, the rim is slid over the wheel, and the rim and tire are bolted to the wheel. To remove, the bolts are removed, a pry bar is inserted in the recessed area of the wheel, and the rim is pried away from the wheel.

30 Claims, 9 Drawing Sheets

WHEEL ASSEMBLY AND METHOD FOR INSTALLATION AND REMOVAL

BACKGROUND OF THE INVENTION

1. Technical Field

The invention relates generally to wheel assemblies mounted on wheeled vehicles. More particularly, the invention relates to wheel assemblies having solid tires. Specifically, the invention relates to a wheel assembly having a solid tire which can be easily installed and removed from a wheel.

2. Background Information

Wheel assemblies for solid tires, such as those used on forklifts and similar wheeled vehicles, have been known for decades. Such assemblies are made with solid tires having a heavy-duty metal interior rim embedded therein. These assemblies are pressed onto heavy-duty wheels for use on wheeled vehicles. Installing and removing such wheel assemblies requires a press which can exert great pressure. Such presses are very expensive and bulky, and thus it is impractical for most owners of vehicles with solid-tire wheel assemblies to own or store such presses. In order to change these wheel assemblies, the users must send their vehicles or wheel assemblies to someone who does own the appropriate equipment, which is very time-consuming and costly. This is very inconvenient and in the case where the vehicle itself must be sent, or no replacement wheel assembly is available the down-time of wheeled vehicles is substantial.

BRIEF SUMMARY OF THE INVENTION

The invention provides a wheel assembly usually having solid tires which the user can remove and install without the use of a high-pressure press.

The invention provides a wheel assembly with a generally frustoconical wheel having a lateral wall with a tapered outer surface. The assembly includes a generally frustoconical rim having a side wall with an outer surface and a tapered inner surface complementary with the outer surface of the wheel. The assembly also includes a tire attached to the outer surface of the rim.

BRIEF DESCRIPTION OF THE DRAWINGS

Similar numerals refer to similar parts throughout the drawings.

DETAILED DESCRIPTION OF THE INVENTION

The wheel assembly of the present invention is indicated generally at 10, and is shown particularly in FIGS. 1–8. Assembly 10 includes a wheel 12, a nm 14 with a tire 16 attached thereto. A means is provided for attaching rim 14 to wheel 12, such as a plurality of bolts 17. Assembly 10 is configured to be "press-free" and thus allows the user to removably replace wheel assembly 10 from wheel 12. Prior art solid tires require a high-pressure press as described above.

In accordance with the invention, wheel 12 is preferably made of cast metal and is generally frustoconical. Other suitable materials may be used to make wheel 12. Wheel 12 includes an annular side wall 18 defining a central circular hole 20, a plurality of smaller threaded holes 21 spaced about circular hole 20 and an annular recessed area 22 situated between hole 20 and holes 21, as is defined in more detail herein below. Recessed area 22 is adapted to receive a pry bar 23. Wheel 12 further includes a lateral wall 24 extending laterally from side wall 18 and having a tapered outer surface 26, which tapers inwardly toward side wall 18. An axle 28 having a central axis 30 extends through hole 20 and is connected to side wall 18, such as by welding. Lateral wall 24 is coaxial with axle 28 about central axis 30. Side wall 18 is perpendicular to axis 30. The angle of tapered outer surface 26 with respect to axis 30 is preferably one degree (exaggerated in FIG. 3A), although this angle may vary without departing from the spirit of the present invention.

Figure 1:
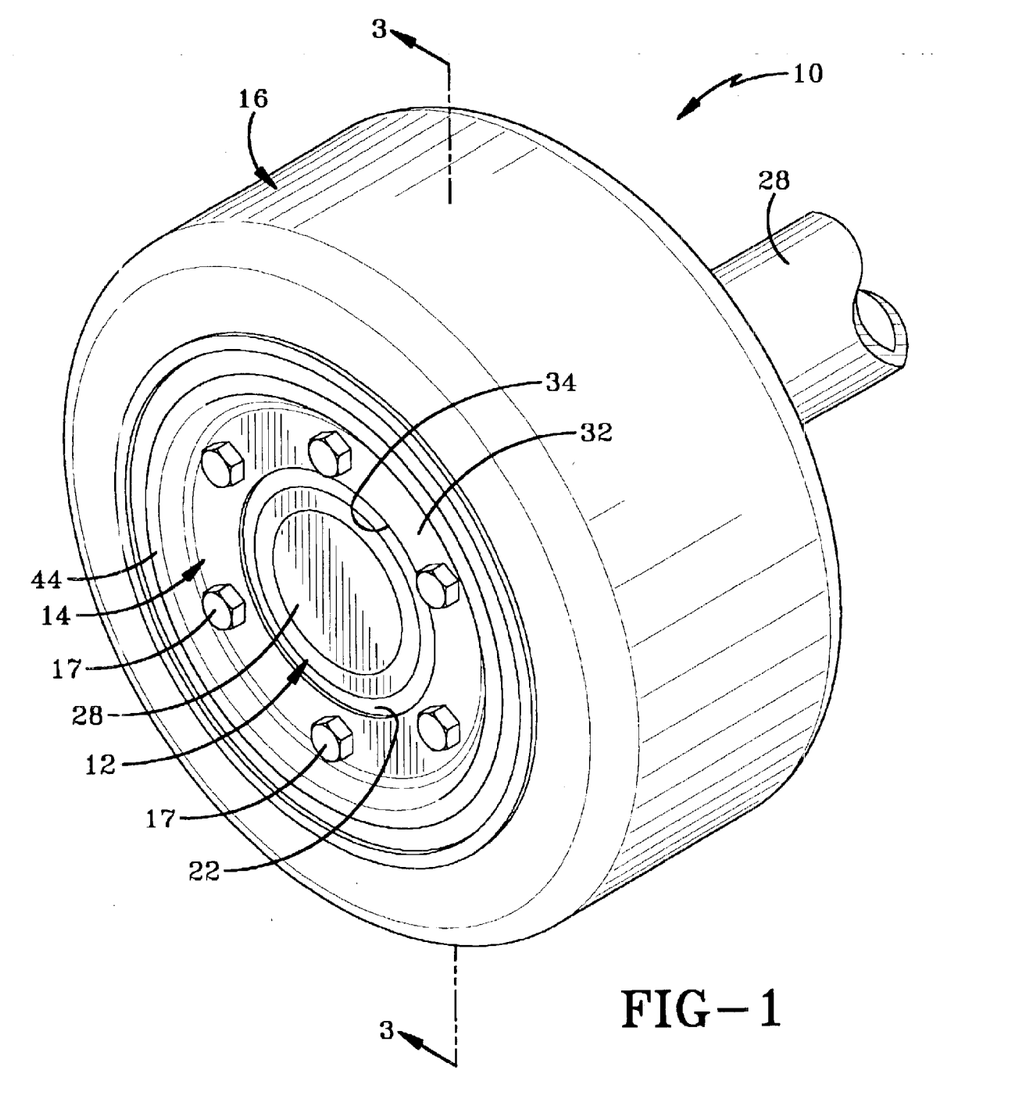
FIG. 1 is a perspective view of the tire assembly of the present invention showing an axle in fragmentary.
Figure 2:
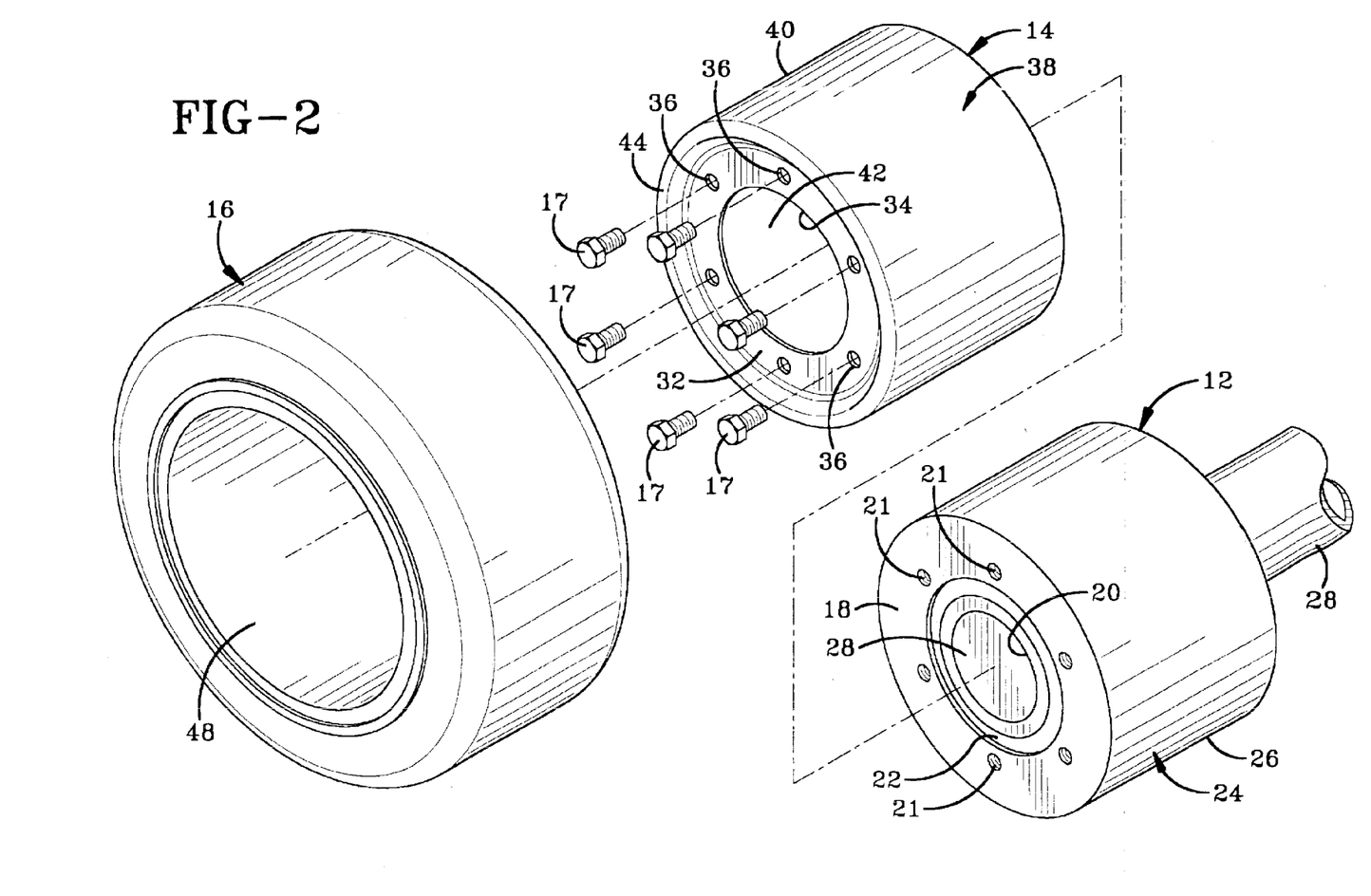
FIG. 2 is an exploded perspective view of the tire assembly shown in FIG.
Figure 3:
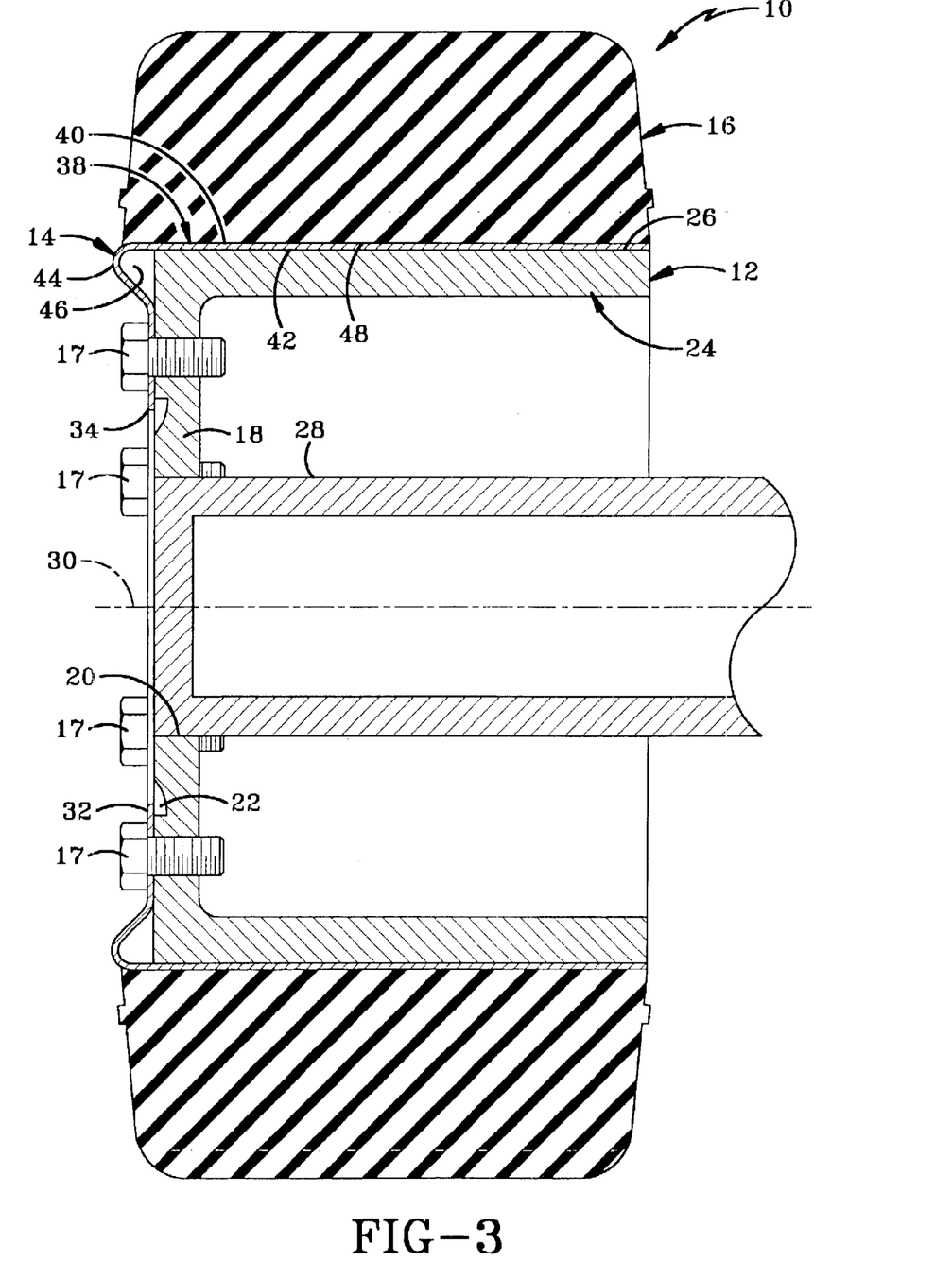
FIG. 3 is a sectional view of the tire assembly taken on line 3—3 of FIG. 1.
Figure 3A:
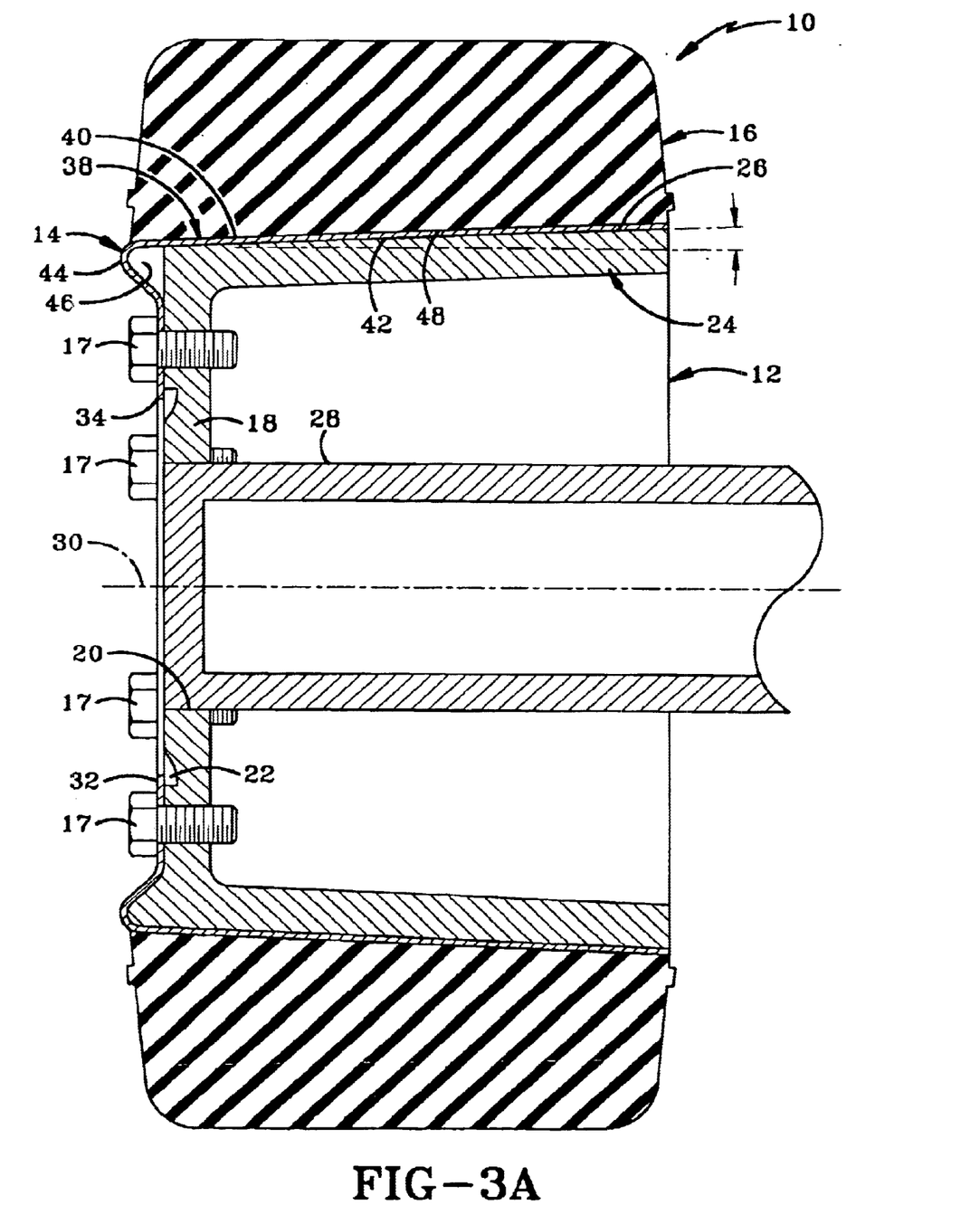
FIG. 3A is similar to FIG. 3 except it shows an exaggeration of the frustoconical tapered outer surface of the wheel lateral wall and of the frustoconical tapered inner surface of the rim annular wall.

Rim 14 is made of stamped metal and is generally frustoconical, although other suitable materials may be used to make rim 14. Rim 14 includes a side wall 32 defining a central circular hole 34 and plurality of smaller holes 36 spaced around central hole 34 and alignable with respective threaded holes 21 of wheel 12. Central hole 34 and recessed area 22 have dimensions so that top wall 32 of rim 14 partially covers recessed area 22 when rim 14 is installed on the wheel 12. Rim 14 further includes an annular wall 38 having an outer surface 40 and a tapered inner surface 42 complementary with outer surface 26 of wheel 12 when wheel 12 is inserted within rim 14. Side wall 32 is connected to annular wall 38 by outwardly extending annular flange 44. As shown in FIG. 2, when wheel 12 is inserted in rim 14, they are coaxial with one another and with axle 28 about central axis 30. A plurality of threaded bolts 17 is the means for attaching rim 14 to wheel 12, although other means may be used, such as drive pins. Side wall 32 is perpendicular to central axis 30 and the angle of tapered inner surface 42 with respect to axis 30 is preferably one degree (exaggerated in FIG. 3A), although this angle may vary without departing from the spirit of the present invention. When rim 14 is installed onto wheel 12, side wall 32 of rim 14 is flush with side wall 18 of wheel 12, and flange 44 extends outwardly so that an annular hollow space 46 is formed between flange 44 and side wall 18.

Tire 16 is preferably an annular, solid shape manufactured of an elastomeric material and includes an inner surface 48 attached to outer surface 40 of rim 14. Tire 16 may be molded with rim 14 inserted in the mold and is generally attached by an adhesive, although other means such as rivets could be used. While tire 16 is usually solid, it may be made with one or more hollow interiors or voids that extend into or through the tire. Suitable materials other than elastomers may be used to make tire 16.

To install tire 16 and rim 14 on wheel 12, and in accordance with the invention, holes 36 in rim 14 are aligned with holes 21 in wheel 12. Rim 14 is placed around wheel 12 and side wall 32 is pressed toward side wall 18 so that inner surface 42 of rim 14 contacts outer surface 26 of wheel 12 and side wall 32 is close enough to side wall 18 that bolts 17 can be inserted through holes 36 and into holes 21 to be threaded therein. Bolts 17 are then tightened to complete the installation. Fasteners other than bolts 17 may be applied to complete the installation. As bolts 17 are tightened, flange 44 creates a biasing force which facilitates sliding rim 14 onto wheel 12. The tapered outer surface 26 of lateral wall 24 and the complementary tapered inner surface 42 of side wall 38 also facilitate sliding rim 14 onto wheel 12 and ensure a snug engagement between rim 14 and wheel 12. The angle of the taper in relation to central axis 30 is small so as to minimize any tendency for rim 14 to slide off wheel 12. The surface area in contact between inner surface 42 and outer surface 26 creates friction which also minimizes the tendency for rim 14 to slide off wheel 12. Further, flange 44 adds structural strength and creates a spring bias to hold side wall 38 of rim 14 on lateral wall 24 of wheel 12. Bolts 17 act as an anchor for the biasing effect of flange 44 in holding tapered surfaces 26 and 42 together.

Figure 4:
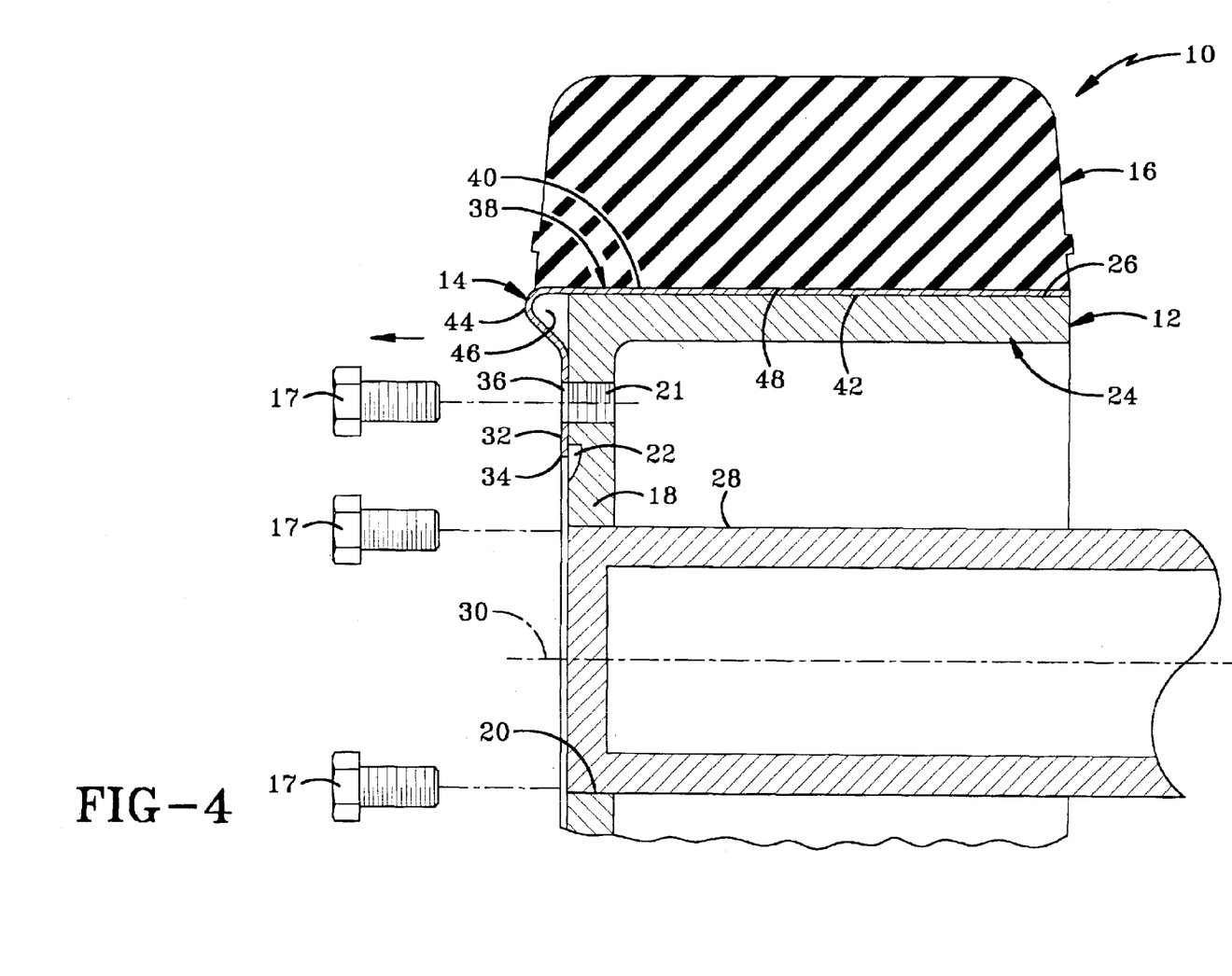
FIG. 4 is a fragmentary sectional view of the tire assembly showing the bolts removed.
Figure 5:
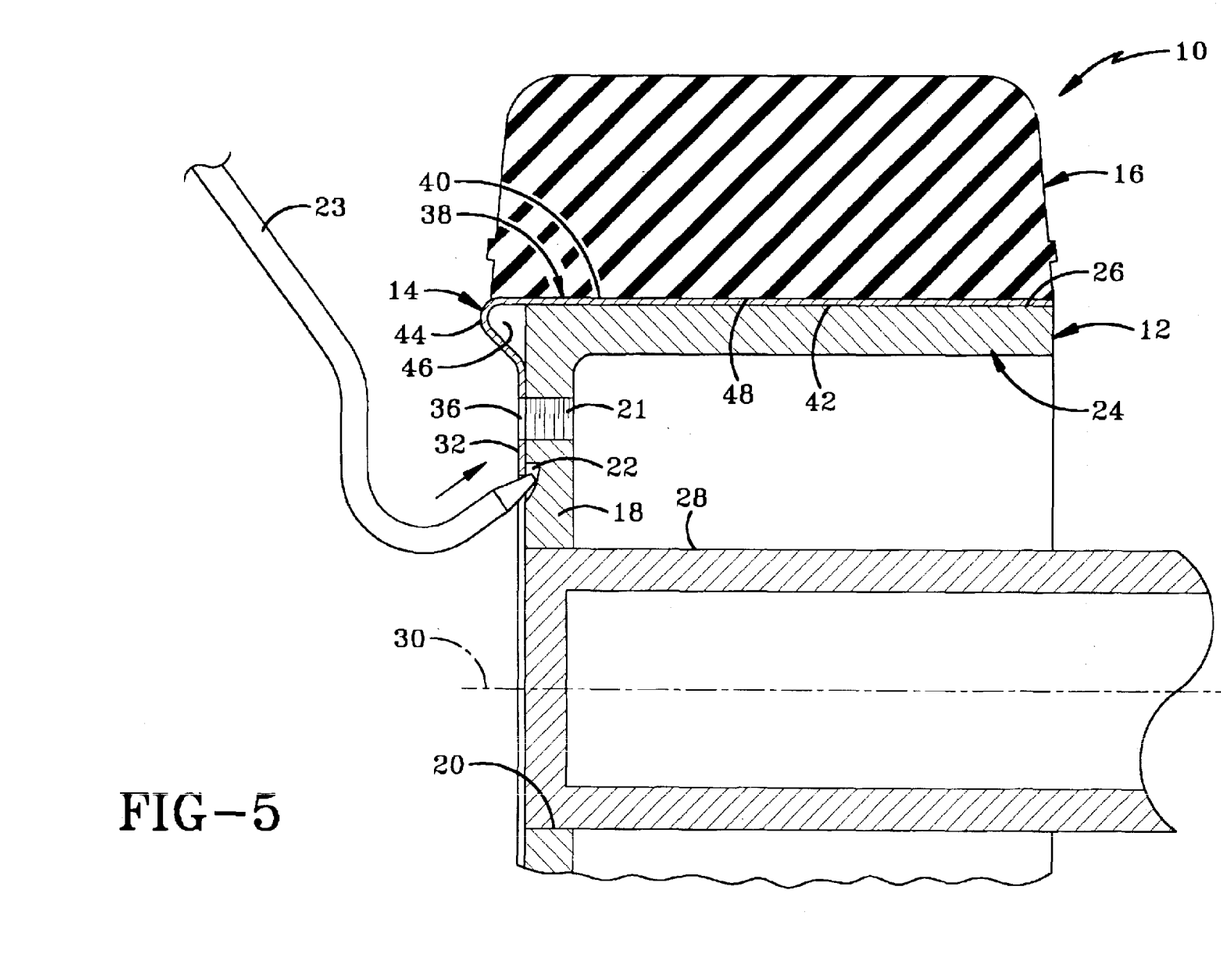
FIG. 5 is a fragmentary sectional view of the tire assembly showing a pry bar in fragmentary inserted into a recessed area of the assembly.
Figure 6:
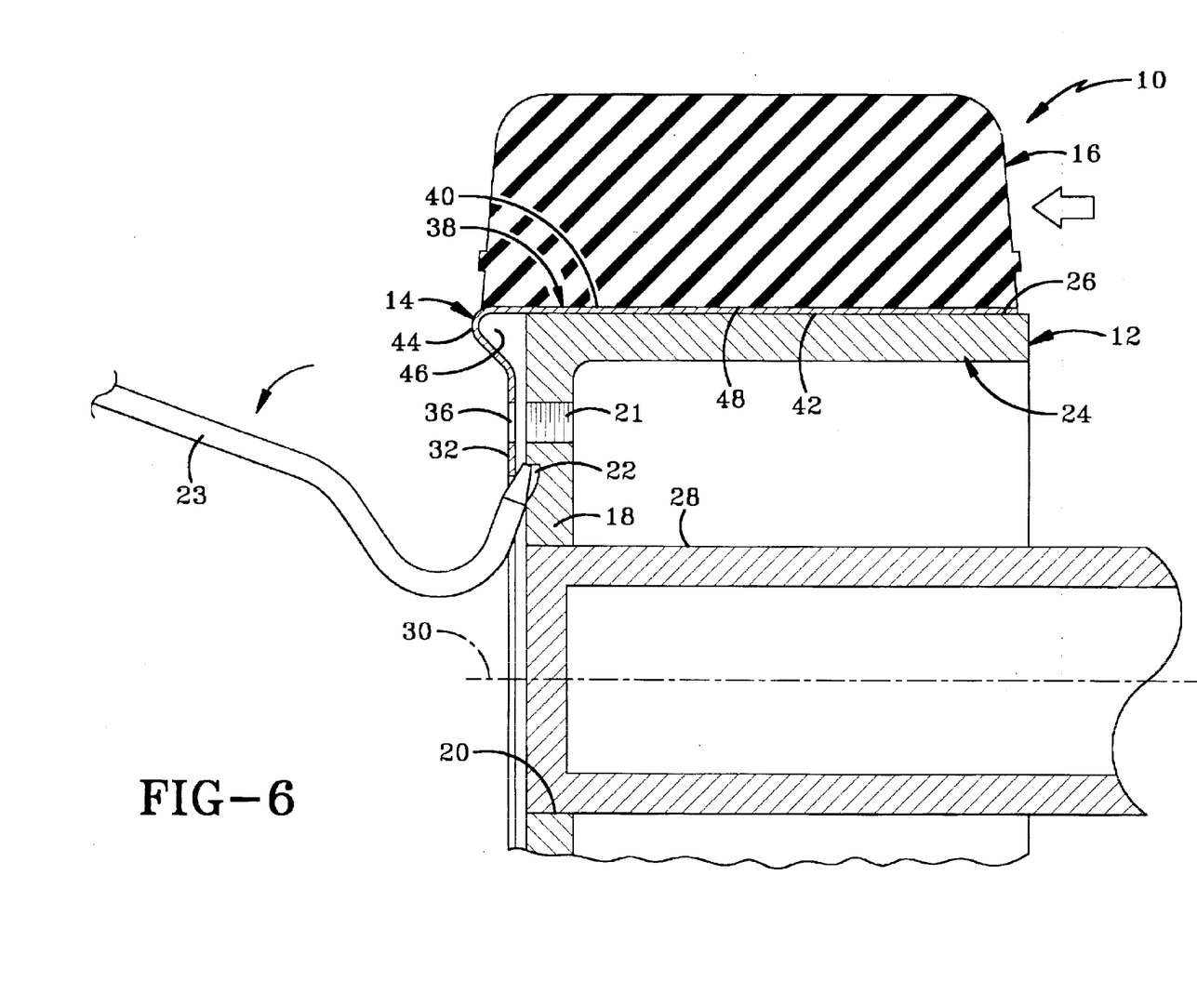
FIG. 6 is a fragmentary sectional view of the tire assembly showing the pry bar beginning to remove the tire and rim from the wheel.
Figure 7:
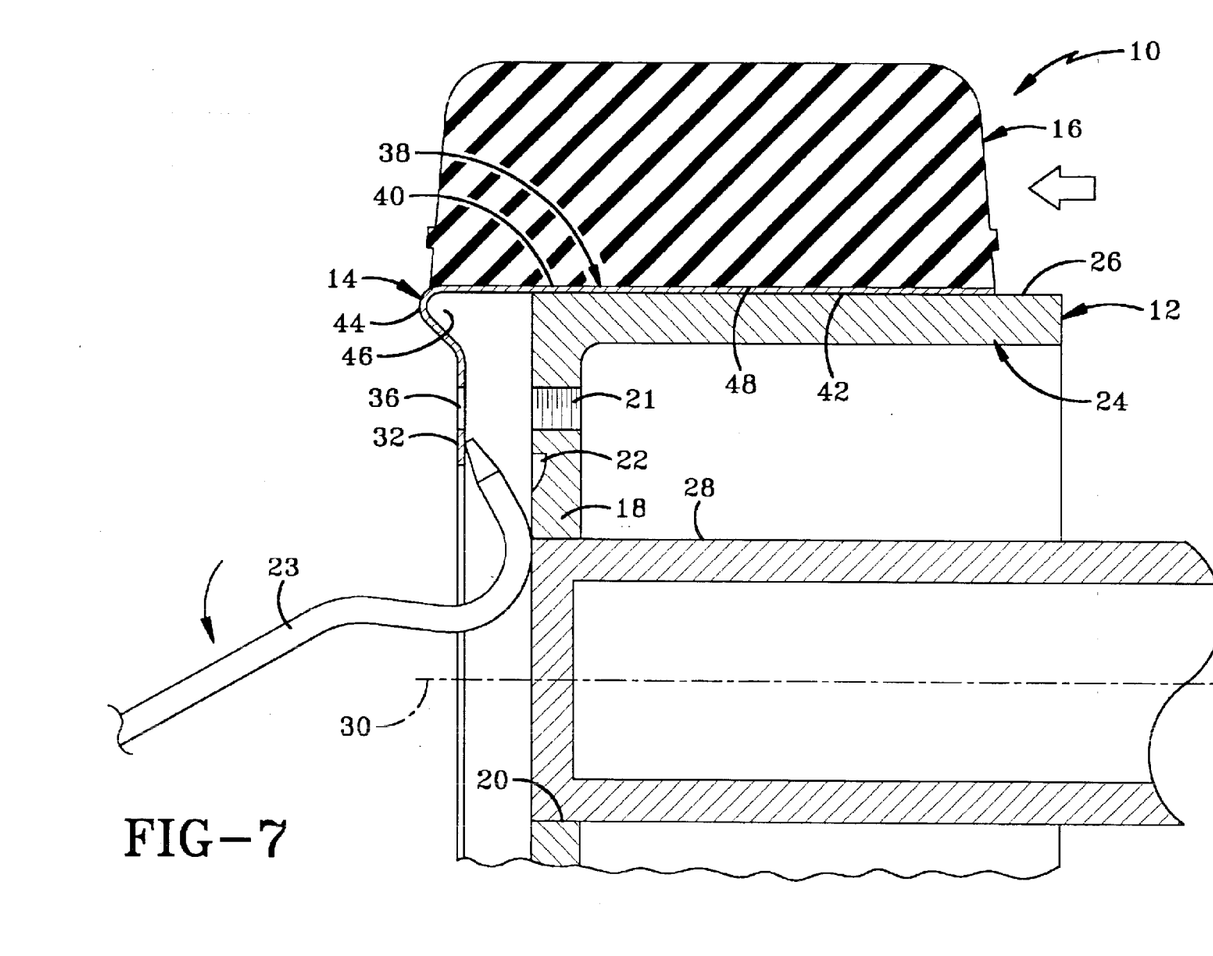
FIG. 7 is a fragmentary sectional view of the tire assembly showing a further stage of removal of the tire and rim from the wheel.
Figure 8:
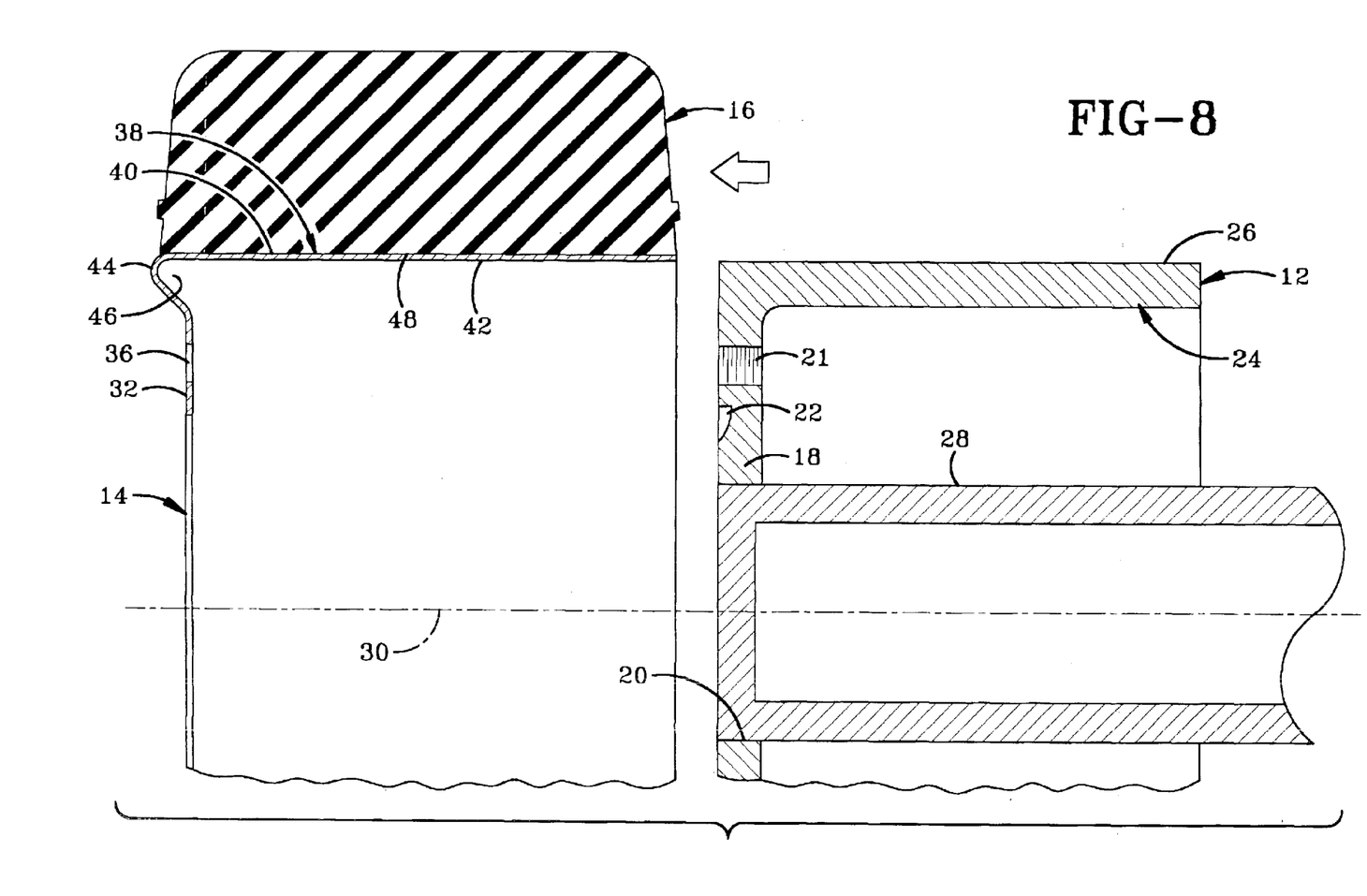
FIG. 8 is a fragmentary sectional view of the tire assembly showing the tire and rim removed from the wheel.

To remove rim 14 and tire 16 from wheel 12, bolts 17 are loosened and completely unthreaded from wheel 12 (FIG. 4). Pry bar 23 is inserted into recessed area 22 beneath side wall 32 of rim 14 (FIG. 5). Pry bar 23 is manipulated to pry rim 14 away from wheel 12 until completely removed (FIGS. 6–8). Flange 44 creates a biasing force which facilitates the removal of rim 14 from wheel 12 as pry bar 23 applies pressure to side wall 32 in prying rim 14 away from wheel 12. In addition, pressure may be applied to tire 16 or rim 14 on the side distal side wall 32 of rim 14 to facilitate their removal. The taper assures that minimal manual effort will be needed when prying rim 14 from wheel 12.)

In the foregoing description, certain terms have been used for brevity, clearness and understanding, but no unnecessary limitations are to be implied therefrom beyond the requirement of the prior art, because such terms are used for descriptive purposes and are intended to be broadly construed. Moreover, the description and illustration of the invention is by way of example, and the scope of the invention is not limited to the exact details shown or described.

Having now described the features, discoveries and principles of the invention, the manner in which the improved wheel assembly is constructed and used, the characteristics of the construction, and the advantageous, new and useful results obtained; the new and useful structures, devices, elements, arrangements, parts and combinations are set forth in the appended claims.

What is claimed is:

1. A wheel assembly comprising:
   a generally frustoconical wheel having a side wall and a circumferential lateral wall with a tapered outer surface;
   a generally frustoconical rim having a side wall and a circumferential annular wall with an outer surface and a tapered inner surface complementary with the outer surface of the wheel;
   a flange extending between the side wall and annular wall of the rim; the flange extending outwardly away from the wheel; and
   a tire attached to the outer surface of the rim.

2. The assembly as defined in claim 1 further comprising fasteners for attaching the rim to the wheel.

3. The assembly as defined in claim 2 wherein the side wall of the wheel defines a plurality of threaded holes and the side wall of the rim defines a plurality of holes alignable with the plurality of holes in the side wall of the wheel; and wherein the fasteners extend through the plurality of holes in the rim and the plurality of holes in the wheel to attach the rim to the wheel.

4. The assembly as defined in claim 3 wherein the fasteners are threaded bolts.

5. The assembly as defined in claim 1 wherein the wheel and the rim have a central axis and the angle of the tapered surfaces in relation to the central axis is one degree.

6. The assembly as defined in claim 1 wherein the tire is solid.

7. The assembly as defined in claim 1 wherein the tire is made of an elastomer.

8. The assembly as defined in claim 1 wherein the rim is manufactured of stamped metal.

9. The assembly as defined in claim 1 wherein the wheel is manufactured of cast metal.

10. The assembly as defined in claim 1 wherein the flange provides spring-bias force to keep the annular wall of the rim adjacent the lateral wall of the wheel when the rim is installed on the wheel.

11. The assembly as defined in claim 1 wherein the side wall of the wheel defines at least one recessed area adapted to be partially covered by the side wall of the rim when the rim is installed on the wheel.

12. The assembly as defined in claim 11 wherein the recessed area is annular.

13. A wheel assembly comprising:
    a generally frustoconical wheel having a side wall and a circumferential lateral wall with a tapered outer surface;
    a generally frustoconical rim having a side wall and a circumferential annular wall with an outer surface and a tapered inner surface complementary with the outer surface of the wheel;
    the side wall of the wheel defining an annular recessed area adapted to be partially covered by the side wall of the rim when the rim is installed on the wheel; the recessed area being adapted to receive a pry bar; and
    a tire attached to the outer surface of the rim.

14. A method of installing a rim and tire on a wheel assembly, comprising the steps of:
    providing a wheel with a side wall and a lateral wall with a tapered outer surface and a rim with a side wall and an annular wall having an outer surface and a tapered inner surface complementary with the outer surface of the wheel; the rim including a flange extending between the side wall and annular wall of the rim; the flange extending outwardly away from the wheel; and a tire attached to the outer surface of the annular wall:
    sliding the complementary surfaces over one another until they frictionally engage;
    aligning holes found in the side wall of the rim with threaded holes found in the side wall of the wheel;
    inserting a threaded bolt through each hole in the side wall of the rim and into the aligned threaded holes in the wheel;
    fastening the rim to the wheel with the bolts, thereby creating a spring bias via the flange which facilitates sliding the rim onto the wheel.

15. The method as defined in claim 14 further including the step of applying pressure to the rim to partially install the rim and tire on the wheel.

16. A method of removing a rim and tire from a wheel assembly, comprising the steps of:

providing a wheel having a side wall and a lateral wall extending therefrom having a tapered outer surface; a rim having a side wall and an annular wall with an outer surface and a tapered inner surface complementary with the outer surface of the wheel; a tire attached to the outer surface of the annular wall; the side wall of the wheel defining at least one recessed area partially covered by the side wall of the rim; and fasteners connecting the rim to the wheel;

removing the fasteners;

inserting a pry bar into the at least one recessed area; and prying the rim away from the wheel with the pry bar.

17. The method as defined in claim 16 in which the rim includes a flange extending between the side wall and annular wall of the rim; and in which the flange extends outwardly away from the wheel; and the prying step of the method further includes the step of creating a spring bias via the flange which facilitates the removal of the rim from the wheel.

18. The method as defined in claim 17 in which the side wall of the wheel defines a plurality of threaded holes and the side wall of the rim defines a plurality of holes spaced around a central hole and aligned with the threaded holes; a plurality of bolts are inserted through the holes in the rim and threaded into the holes in the wheel to attach the rim to the wheel; and in which removing step of the method further comprises the step of:

unthreading the bolts.

19. The method as defined in claim 18 further comprising the step of applying force to the rim to assist in the removal.

20. A wheel assembly comprising:

a wheel having a side wall and a circumferential lateral wall with an outer surface;

a rim having a side wall and a circumferential annular wall with an outer surface and an inner surface complementary with the outer surface of the wheel;

the side wall of the wheel defining at least one recessed area which is partially covered by the side wall of the rim when the rim is installed on the wheel; the recessed area being adapted to receive a pry bar; and a tire attached to the outer surface of the rim.

21. The assembly of claim 20 wherein the outer surface of the lateral wall of the wheel is generally frustoconical and the inner surface of the annular wall of the rim is generally frustoconical.

22. The assembly of claim 20 wherein the at least one recessed area is annular.

23. A method of installing a rim and tire on a wheel assembly, comprising the steps of:

providing a wheel having a circumferential lateral wall with an outer surface and a rim with a side wall and an annular wall having an outer surface and an inner surface complementary with the outer surface of the wheel; the rim including a flange extending between the side wall and annular wall of the rim; the flange extending outwardly away from the wheel; and a tire attached to the outer surface of the annular wall;

positioning the tapered inner surface of the annular wall of the rim over the tapered outer surface of the lateral wall of the wheel; and creating a spring bias via the flange which facilitates sliding the rim onto the wheel.

24. The method of claim 23 further including the step of applying pressure on the side wall of the rim in a direction toward the wheel to create the spring bias.

25. The method of claim 24 further including the step of fastening the rim to the wheel to create the pressure on the side wall.

26. The method of claim 25 wherein the step of fastening the rim to the wheel includes the step of threading threaded bolts into threaded holes formed in the wheel.

27. The assembly of claim 23 wherein the outer surface of the lateral wall of the wheel is generally frustoconical and the inner surface of the annular wall of the rim is generally frustoconical.

28. A method of removing a rim and tire from a wheel assembly, comprising the steps of:

providing a wheel having a side wall and a lateral wall extending therefrom having an outer surface; a rim having a side wall and an annular wall with an outer surface and an inner surface complementary with the outer surface of the wheel; a tire attached to the outer surface of the annular wall; the side wall of the wheel defining at least one recessed area partially covered by the side wall of the rim; and fasteners connecting the rim to the wheel;

removing the fasteners;

inserting a pry bar into the at least one recessed area; and prying the rim away from the wheel with the pry bar.

29. The method as defined in claim 28 in which the rim includes a flange extending between the side wall and annular wall of the rim; and in which the flange extends outwardly away from the wheel; and the prying step of the method further includes the step of creating a spring bias via the flange which facilitates the removal of the rim from the wheel.

30. The method of claim 28 wherein the at least one recessed area is annular.

* * * * *